UNITED STATES PATENT OFFICE.

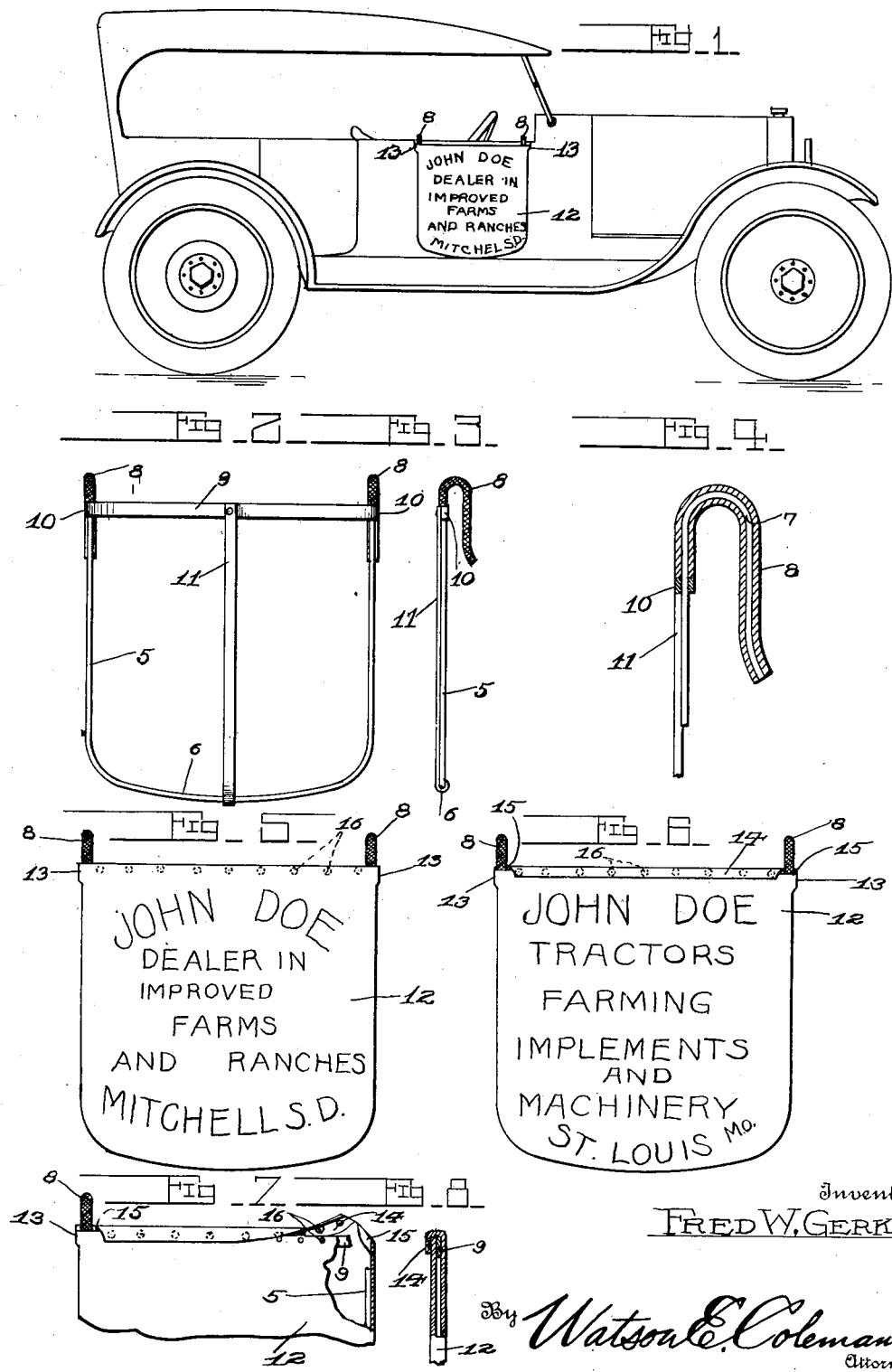

FRED W. GERKEN, OF MITCHELL, SOUTH DAKOTA.

ADVERTISING DEVICE FOR VEHICLES.

1,371,678.
Specification of Letters Patent.
Patented Mar. 15, 1921.

Application filed September 27, 1920. Serial No. 412,902.

*To all whom it may concern:*

Be it known that I, FRED W. GERKEN, a citizen of the United States, residing at Mitchell, in the county of Davison and State of South Dakota, have invented certain new and useful Improvements in Advertising Devices for Vehicles, of which the following is a specification, reference being had to the accompanying drawings.

This invention relates to advertising devices and particularly to advertising devices for use on vehicles.

An object of the invention is to provide a device of this character capable of being readily applied and removed from a vehicle such as an automobile.

Another object is to provide a device of this character which may be readily applied to the side of a vehicle without requiring the application of fastening means to the vehicle and without marring the vehicle in any manner.

Another object is to provide a device of this character including a frame having a pair of covered hooks adapted to engage the side of the vehicle, said frame being disposed in a fabric casing, the sides of the casing being provided with advertising matter.

Another object of the invention is to provide a device of this character including a casing open at one end, a flap carried by said casing for closing the open end, said casing being arranged to receive a supporting frame, the ends of said flap being extended inwardly to provide passages for the supporting members of the frame.

A still further object of the invention is to provide a device of this character including a frame and a fabric casing embracing the frame, said casing being removable for the purpose of changing the advertising matter by reversing the same.

With the above and other objects in view, the invention consists in the improved construction and arrangement of parts, to be hereinafter more particularly described, fully claimed and illustrated in the accompanying drawings; in which:

Figure 1 is a side elevation of an automobile showing the invention applied,

Fig. 2 is a front elevation of the frame,

Fig. 3 is a side elevation.

Fig. 4 is a fragmentary sectional view through the covering and connecting rod of the frame, Fig. 5 is a front elevation of the casing applied to the frame, Fig. 6 is a rear elevation of the casing applied to the frame, Fig. 7 is a detail view of the flap or extension showing the manner of fastening the same, and Fig. 8 is a transverse sectional view through the upper portion of the frame and casing with the extension or flap in its closed position.

Referring to the drawings, 5 designates a supporting frame comprising a bar 6 substantially U-shaped in formation, the ends of the bar being extended back upon the same to provide hooks 7. Each of the hooks 7 is provided with a cover of fabric 8 to prevent the hook from marring the vehicle. A connecting member 9 extends transversely of the ends of the rod 6 and is secured to said ends adjacent the hooks 6 and 7 by extending the end portions of said member back upon the same to provide clamps 10. In this way, a substantial frame is provided with the use of a small amount of material. To render the frame more substantial, a brace 11 is secured to the intermediate portion of the connecting member 9 and clamped to the intermediate portion of the rod 6.

The advertising member used in connection with the frame 5 consists of a fabric casing 12 made in accordance with the shape of the frame 5 and adapted to snugly engage said frame. The end 13 of the casing is open, one side of the casing including an extension 14 which projects beyond the end 13 to provide a flap. The ends of the flap are extended inwardly away from the ends of said open end so as to provide passages 15 through which the end portions of the rod 6 project when the flap is in its closed position. In this way, the hooks 7 are permitted to project through the passages 15 without interfering with the connection of the flap to the casing or causing protuberances in the surface of the casing. Fastening means such as the snap fasteners 16 are disposed between the marginal edge of the extension 14 and marginal edge of the opposite side of the casing.

It will be noted that the frame as well as the casing is constructed according to the size and shape of an automobile door so as to permit the device to be engaged with the door. The casing may be made of fabric colored similar to the color of the vehicle and in this way the casing appears to be part of the vehicle when viewed from a distance. Both sides of the casing 12 may be provided with various advertising matter, one side containing advertising matter relative to one article or line of business and the other side provided with advertising matter relative to a different article or different line of business or advertising matter of the same article or same line of business in a different form. The frame 5 is intended to be disposed within the casing 12, the extension 14 extending over the upper edge of the connecting member 9 and secured to the opposite side of the casing by the snap fasteners 16. In this way, the fabric is held taut so as to eliminate folds and creases. The covering on the hooks prevents the same from scratching the vehicle and as the hooks are made of resilient material, there is no danger of the device being accidentally disengaged from the vehicle.

When it is desired to change the advertising matter, the extension 14 is unfastened so as to permit removal of the frame 5 whereupon the casing is reversed so as to bring the advertising matter on the opposite side thereof into view. The frame 5 is then disposed within the casing and the extension 14 fastened as above described and the device applied to the vehicle. When the automobile is not being used for business, the device may be readily disengaged from the side of the vehicle and stored in a convenient place within the same. In addition to this, the casing 12 may be used for carrying matter such as advertising pamphlets, bills and like articles which will not cause the surface of the casing to bulge, it being impossible for the articles to be jolted from the casing in view of the extension 14.

From the foregoing it will be readily seen that this invention provides a novel advertising device which is very simple and compact, can be readily applied to any portion of the side of a vehicle such as an automobile and permits an automobile to contain advertising matter and still be used for business and pleasure as it may be readily applied and removed. In addition to this it does not require special fastening means to be secured permanently to the vehicle and does not mar or disfigure the vehicle in any manner, and as the hooks are relatively long and firmly engage the side of the vehicle, it is impossible for wind to dislodge the device.

What is claimed is:—

1. A device of the character described comprising a frame, supporting means carried by said frame and a fabric casing open at one end, a flap carried by the casing for closing said open end, said casing being arranged to receive the frame, said flap extending over a portion of the frame, and means for connecting the marginal edge of said flap to the casing.

2. A device of the character described comprising a frame including a U-shaped member, the ends of said member being formed into hooks, a transversely extending connecting member, connecting the end portions of said U-shaped members to each other, a brace connecting the intermediate portions of the first and second mentioned members to each other, a casing open at one end, said casing being arranged to receive the frame and means for closing said open end of the casing.

3. A device of the character described comprising a frame having spaced parallel hooks projecting from one end portion, a fabric casing open at one end and arranged to receive said frame, one of the sides of said casing including an extension, the ends of said extension being extended inwardly to provide unobstructed passages for said hooks, and fastening means disposed between the extension and the end of the opposite side of the casing.

In testimony whereof I hereunto affix my signature.

FRED W. GERKEN.